Sept. 6, 1960  A. F. DEMING ET AL  2,951,385
AXIAL SHIFT DRIVE MECHANISM

Filed Feb. 11, 1958  3 Sheets-Sheet 1

INVENTORS
ANDREW F. DEMING
ALVIN J. CARLI
BY Woodling and Krost,
attys.

Sept. 6, 1960     A. F. DEMING ET AL     2,951,385
AXIAL SHIFT DRIVE MECHANISM

Filed Feb. 11, 1958     3 Sheets-Sheet 3

INVENTORS
ANDREW F. DEMING
ALVIN J. CARLI
BY Woodling and Krost
attys

United States Patent Office 2,951,385
Patented Sept. 6, 1960

2,951,385

AXIAL SHIFT DRIVE MECHANISM

Andrew F. Deming, Alliance, and Alvin J. Carli, Sebring, Ohio, assignors to The Alliance Manufacturing Company, Division of Consolidated Electronics Industries Corporation, Wilmington, Del.

Filed Feb. 11, 1958, Ser. No. 714,531

16 Claims. (Cl. 74—199)

The invention relates in general to a phonograph drive mechanism and more particularly to phonograph drive plural speed mechanisms wherein an idler wheel is moved axially relative to a drive shaft having two portions of different diameters.

This case is a continuation-in-part of application Serial No. 578,262 filed April 16, 1956, entitled "Axial Shift Phonograph Drive."

The prior art has shown many phonograph drive mechanisms of the plural speed type wherein the shifting from one speed to another is accomplished by a friction wheel being moved in a generally axial direction relative to a drive wheel or drive shaft wherein some member in the drive train has two coaxially aligned drive portions of different diameters. These two drive portions, when selectively interposed in the drive train, provide two different speeds to the phonograph turntable. Generally, such two drive portions are interconnected by a right angle shoulder and therefore some retracting mechanism is necessary to retract in a lateral direction a shiftable drive member, such as an idler wheel, before the axial movement of such shiftable member may take place. This is considered necessary in order to prevent the shiftable member from catching or snagging on the right angle shoulder.

The present invention relates to the axial shifting type of phonograph drive mechanism but has for one of its objects the provision of a mechanism wherein the lateral retraction of the shiftable member is not required and hence provides a simplified mechanism because only an axial movement of the shiftable member is required.

Another object of the invention is to provide an axially shiftable idler wheel in a drive mechanism wherein the idler wheel frictionally engages a stepped drive shaft and a flange of a turntable and wherein the drive shaft is provided with a sloping or conical surface interconnecting the two stepped portions so that as the idler wheel is axially shifted from the small to the larger diameter stepped portion, it slides axially on the sloping surface without necessity for retracting the idler wheel from either the drive shaft or the turntable flange.

Still another object of the invention is to provide an idler mechanism for a phonograph drive system wherein the idler wheel of the idler mechanism is axially shifted to engage either of two different diameter drive portions on a drive shaft and slides on a sloping surface interconnecting such drive portions with the shifting movements being effected by a cam having an inclined plane and moving in a plane generally perpendicular to the axial movement of the idler wheel, wherein the cam imparts both an axial and a rotational thrust to the idler wheel with the thrust being at least counteracted by a rotational component of a cam spring, which also has an axial component to urge the cam into cooperation with a cam follower on the idler mechanism.

Another object of the invention is to provide an idler mechanism which is in the form of a toggle linkage which may collapse to retract an idler wheel from a drive shaft having portions of two different drive diameters interconnected by a sloping surface and wherein axial shifting movement of the idler wheel is effected by movement of a cam imparting an axial thrust to the idler wheel and also imparting a lateral thrust tending to collapse said toggle linkage, and with said tendency to collapse being at least counteracted by a rotational torque provided by a single cam spring which simultaneously provides an axial thrust on said toggle linkage.

Another object of the invention is to provide an idler mechanism which constantly maintains an idler wheel in engagement with a drive shaft even during shifting movements of the idler wheel from one shaft drive portion to another and also constantly maintains said idler wheel in engagement with a flange of a turntable with greater frictional force being established with said turntable than with said drive shaft.

Other objects and a fuller understanding of this invention may be had by referring to the following description and claims, taken in conjunction with the accompanying drawing, in which:

Figure 1:
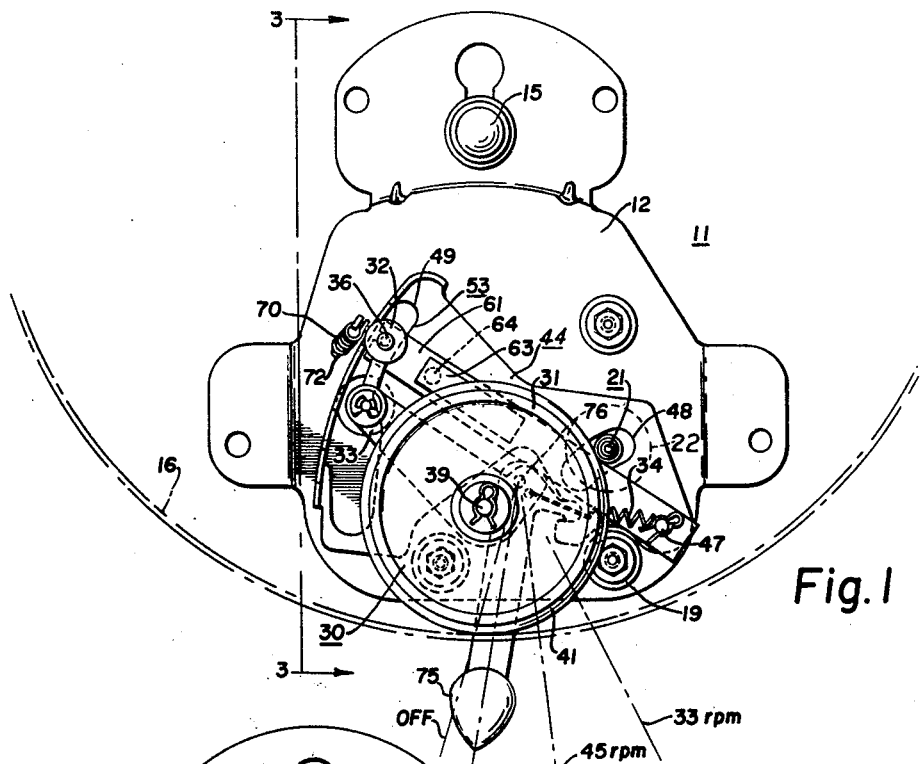
Figure 1 is a plan view of the complete phonograph drive mechanism in a high speed position.
Figure 2:
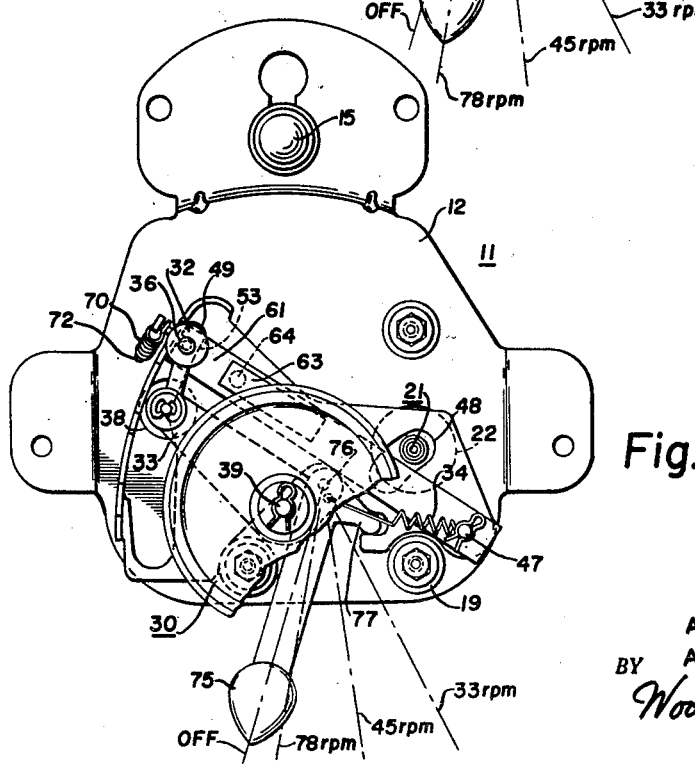
Figure 2 is a plan view of the drive mechanism in an off position.
Figure 3:
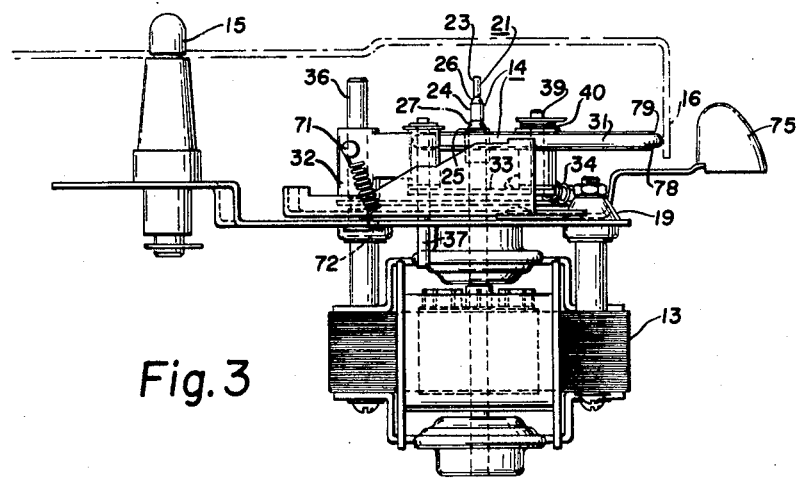
Figure 3 is an elevational view of the drive mechanism in the high speed position.

Figures 1, 2, and 3 show the complete phonograph drive mechanism 11 which includes generally a support plate 12 carrying a motor 13 which drives through a drive train 14 to a turntable which may be journalled on the spindle 15 and which is indicated schematically as having a peripheral downturned flange 16.

The support plate 12 is designed to be mounted on the complete phonograph mechanism, such as on a usual cabinet plate, and the motor 13 may be dependently supported at three points by shock mounts 19. The motor drives a drive shaft 21 which in the embodiment shown is the same as the motor shaft, and this drive shaft extends vertically upwardly when the support plate is mounted in its usual horizontal position. The drive shaft 21 extends through an aperture 22 in the support plate 12 and has first, second, and third coaxial cylindrical drive portions 23, 24, and 25 interconnected by first or second sloping or conical surfaces 26 and 27, respectively.

An idler mechanism 30 includes an idler wheel 31 which is included in the drive train 14. The idler mechanism 30 also includes an idler bearing 32, an idler link 33, and an idler spring 34. The idler bearing 32 is journalled for rotational and axial movements on an upstanding post 36 which is fixedly carried generally perpendicular to the support plate 12. The upstanding post 36 may thus act as a first pivot for the idler mechanism 30. A vertical axle 37 acts as a second pivot for pivotally interconnecting the idler bearing 32 and the idler link 33. This vertical axle 37 depends through an aperture 38 in the support plate 12. At the outboard end of the idler link 33 the idler wheel 31 is journalled on a third pivot 39, and spacers 40 are used to regulate the vertical height of the idler wheel 31 relative to the idler bearing 32.

The idler wheel 31 carries a peripheral tire 41 of rubber-like material for good frictional engagement with both the drive shaft 21 and turntable flange 16. A shifter mechanism 44 includes a shifter cam 45 which is, in this preferred embodiment, a part of a shifter plate 46. A fourth pivot 47 pivotally mounts the shifter plate 46 to the support plate 12. The shifter plate is provided with an aperture 48 to surround the drive shaft 21 and provided with a slotted aperture 49 at the outboard end thereof to surround both the upstanding post 36 and the vertical axle 37. A retract cam 53 forms a part of the inboard edge of the slotted aperture to cooperate with the vertical axle, as shown in Figure 2 as distinguished from Figure 1 to provide an off position of the phonograph drive mechanism whereat the idler wheel 31 is retracted from the drive shaft 21.

The shifter cam 45 forms the outboard edge of the slotted aperture 49 and has an upper edge 54 which includes first, second, and third steps or plateaus 55, 56, and 57, respectively. These steps are interconnected by first and second inclined planes 58 and 59, respectively.

The shifter plate 46 is held in position not only by the slotted aperture 49 and pivot 47 but also by a holddown and detent bracket 61. This bracket 61 is generally parallel to the support plate 12 and has one end fixed at the pivot 47 and the other end forked and received in a notch 62 of the upstanding post 36. The bracket 61 carries a detent leaf spring 63 urging a ball 64 into engagement with any one of four holes 65 in the shifter plate 46 to selectively maintain such shifter plate in any one of four positions. One of said positions corresponds to the off position previously described, and the other three correspond to low, medium, and high speed conditions wherein the idler wheel 31 is disposed at the level of any one of the three drive portions 23, 24, and 25.

A planar surface 67 is provided on the underside of the idler bearing 32 and only a single portion of this planar surface 67 is used as a cam follower 68 for cooperation with the shifter cam 45. This cam follower is on the outboard part of the underside of the idler bearing 32 generally on a line intersecting the first and fourth pivots; namely, the upstanding post 36 and the pivot 47. A cam spring 70 is connected between a projecting lug 71 on the outboard edge of the idler bearing 32, and the edge of a hole 72 on the support plate 12. The edge of the hole 72 is positioned relative to the idler bearing 32 so as to maintain the direction of force of the tension cam spring 70 other than vertical. This cam spring 70 therefore has both a vertical and a horizontal component, that is, a component perpendicular to the support plate 12 and another component lateral or parallel thereto. This lateral or parallel component may also be considered as imparting a rotational component of force to the idler bearing 32. As viewed in Figures 1 and 2, this rotational component is counterclockwise to urge the idler bearing and the entire idler mechanism 30 counterclockwise, to thus urge the idler wheel 31 into engagement with both the drive shaft and the turntable flange 16. The direction of force of said cam spring is more nearly perpendicular to said inclined planes 58 and 59 than to either the horizontal or the vertical. The shifter plate 46 is moved by a shifter lever 75 pivoted at 76 and having a tongue 77 acting on the shifter plate 46. The shifter lever 75 has four positions as determined by the detent holes 65, with these four positions being an off position and positions for 78, 45, and 33 r.p.m. as diagrammatically illustrated in Figure 1.

*Operation*

Figure 4:
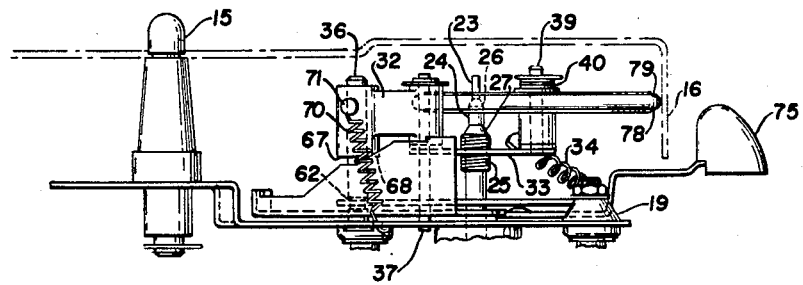
Figure 4 is a partial elevational view of the drive mechanism shown partially shifted between the medium and low speed positions.
Figure 5:
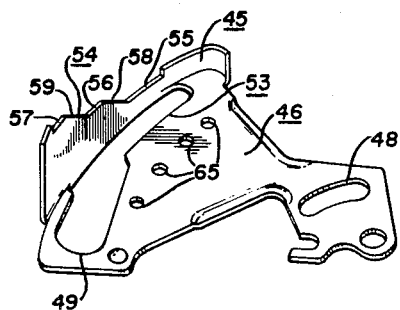
Figure 5 is a three dimensional view of the shifter cam.

The idler mechanism 30 which includes the idler bearing 32 and idler link 33 pivoted at the vertical axle 37 forms a toggle linkage with the vertical axis 37 disposed in a first direction relative to a line joining the pivots 36 and 39. This first direction, as shown in Figure 1, is to the left relative to this aforesaid reference line. The cam spring 70 exerts a rotational force in a counterclockwise direction which tends to expand said toggle linkage. The shifter cam coacts with the cam follower 68, as best shown in Figures 3 and 4; and Figure 4 shows the transition during the shifting movement between the medium and low speeds which in this particular embodiment are 45 and 33 r.p.m. As shown in Figure 4 when the inclined plane 59 is cooperating with the cam follower 68 and the shifter cam 45 is being moved toward the left, then because the inclined plane slopes upwardly to the right as shown in this view, there is a component of thrust imparted to the idler bearing to tend to rotate this idler bearing 32 in a clockwise direction as viewed in Figures 1 and 2. This clockwise thrust tends to collapse the idler linkage and tends to move the vertical axle 37 farther in the first or leftward direction, as shown in Figures 1 and 2. This tendency toward collapse of the toggle linkage is a tendency to make the idler wheel 31 retract from the drive shaft 21. This tendency toward collapse of the toggle linkage is resisted by the horizontal component of the cam spring 70, and thus as the idler wheel 31 is shifted axially, it slides on the sloping or conical surfaces 26 and 27 and does not leave the surface of the drive shaft 21.

The idler spring 34 has its fixed end attached to the pivot point 47 and, as best shown in Figures 1 and 2, the direction of application of force of this idler spring 34 on the idler link 33 is such as to cause a greater degree of frictional engagement between the idler wheel 31 and the turntable flange 16 than between the idler wheel 31 and the drive shaft 21. This prevents indentation and deformation of the tire 41 and yet sufficient frictional drive from the motor to the turntable is effected because the motor shaft 21 rotates counterclockwise, as viewed in Figure 1, to thus give a wedging action of the idler wheel 31 between the drive shaft 21 and the turntable flange 16. The idler spring 34 exerts a force to tend to prevent retraction of the idler wheel 31 relative to the drive shaft 21; but if this idler spring 34 is made too strong to resist the component of retractile force caused by the shifter cam movement, then too great a force causing indentation of the tire 41 may result. By using the cam spring 70 to have both a horizontal and a vertical component, with the horizontal component bearing directly on that side of the idler bearing 32 that the shifter cam 45 bears on, then these two opposing forces are effectively canceled. Any friction at the upstanding post 36 and/or the vertical axle 37, therefore, does not enter into a concellation of these forces as would be the case if the idler spring 34 were attempted to be made stronger to resist this retractile force.

The point at which the shifter cam 45 bears on the cam follower 68 is purposely made very close to the axis of the upstanding post 36 in order to minimize the amount of retractile force imparted to the idler bearing by movement of the shifter cam 45. In this preferred embodiment the radial dimension is only about .15 inch, which is less than one-tenth of the radial distance between the pivots 36 and 39. Therefore, a very small leverage is established by the shifter cam 45 so that only a small amount of horizontal component of the cam spring 70 is necessary to withstand such retractile thrust.

The present phonograph drive mechanism is especially useful with the small two-pole induction motors currently in use. With power frequencies of sixty cycles, this provides a nominal speed of 3600 r.p.m. at the drive shaft 21. Actually, due to slippage inherent in such induction motors, the rotational speed is in the order of 3400 r.p.m. To obtain phonograph turntable speeds of 33, 45, or 78 r.p.m., this means a speed reduction in the order of fifty or one hundred to one. Thus, the diameter of the first drive portion 23 will be about .08 inch for an eight inch diameter turntable rim 16, and the diameter of the third drive portion 25 will be in the order of .18 inch. This means that the three drive portions 23, 24, and 25 differ only slightly in diameter; and thus the sloping or conical surfaces 26 and 27 may successfully be used between these drive portions without making such conical portions excessively long. To help the shifting, the lower edge 78 of the tire 41 is rounded; and actually, the upper edge 79 is also rounded for ease in manufacture of this idler wheel 31.

It will be noted that whenever either of the inclined planes 58 or 59 is in cooperation with the cam follower 68, no matter which way the shifter cam 45 is being moved, then there is a component of force parallel to the support plate 12 imparted to the idler mechanism 30 which gives a retractile thrust. This tends to withdraw the idler wheel 31 from the drive shaft 21. If the shifter cam sloped upwardly to the left rather than upwardly to the right as viewed in Figures 3 and 4, then the horizontal force caused by movement of the shifter cam would tend to make the toggle linkage expand and urge the idler wheel 31 against the drive shaft 21. This would then be additive to the idler spring 34 and cause an extra amount of frictional engagement of the idler wheel with both the drive shaft 21 and turntable flange 16. By making the slope of the shifter cam 45 upwardly to the right, as viewed in Figures 3 and 4, then this extra force urging the idler wheel 31 against both the drive shaft 21 and turntable flange 16 is avoided. Therefore, the retractile force in the horizontal plane caused by shifting is at least counteracted by the rotational thrust caused by the cam spring 70; and yet the axial thrust caused by the shifter cam 45 easily may overcome the frictional resistance of the idler wheel 31 with both the drive shaft 21 and turntable flange 16 during shifting movements so that this shifting may be effected, at least as soon as the motor is next energized to rotate the turntable.

Still another feature in the present invention is that by using the conical surfaces 26 and 27, the assembly of the drive unit may be simplified. The spacers 40 are used to space the vertical height of the idler wheel 31 relative to the idler bearing 32 and accordingly relative to the drive portions 23, 24, and 25 whenever the idler bearing 32 is in cooperation with the respective step on the shifter cam. Due to variations among successive parts on the assembly line, these spacers 40 have in the past been found to be necessary to carefully align the level of the idler wheel 31 with the level of the three steps or drive portions 23, 24, and 25. In the prior art, which had sharp shoulders between the plurality of drive portions on the drive shaft and which utilized a mechanism specifically designed to retract the idler wheel from the drive shaft, one had to make certain that the spacers 40 were correctly located on the top and the bottom of the idler wheel; otherwise the idler wheel might hang up or catch on one of the shoulders. This would be because the tire of the idler wheel could be so close to a right angle shoulder that axial movement of the idler wheel would start before the lateral retract movement due to wearing of the parts, and thus the shifting of the drive train from one speed to another would not be correctly accomplished. In the present invention, by using the conical or sloping surfaces 26 and 27, the spacing of the idler wheel by the spacers 40 is not nearly so critical.

Therefore, it will be seen that the present invention establishes a shifting mechanism which is simple and economical to manufacture and assemble because no retractile mechanism is necessary and because the idler wheel 31 is merely shifted in an axial direction with the idler wheel sliding up or down as the case may be on the conical surfaces between drive portions.

Figure 6:
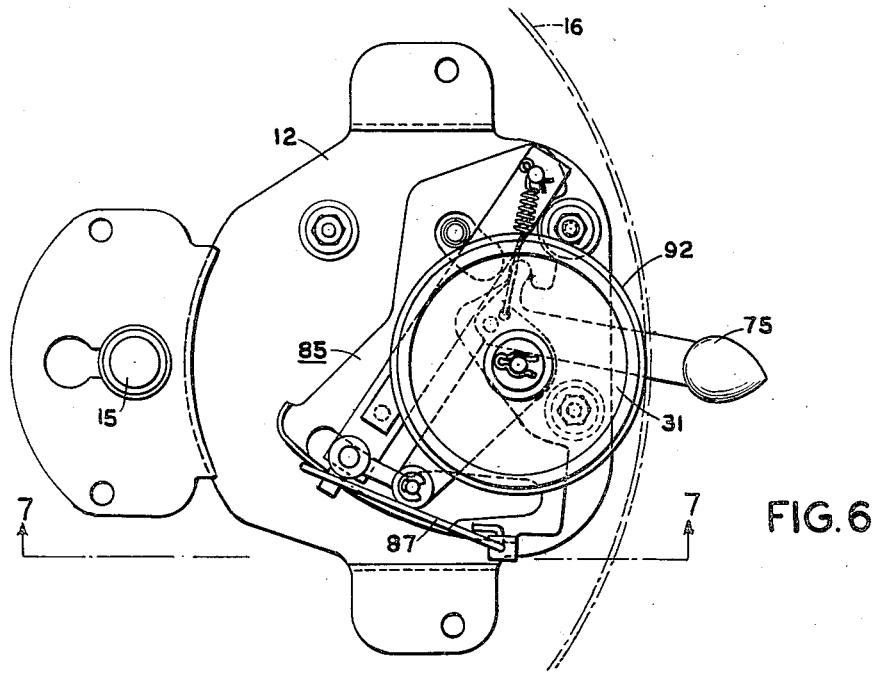
Figures 6 and 7 are top and front views of a modification of the invention.
Figure 7:
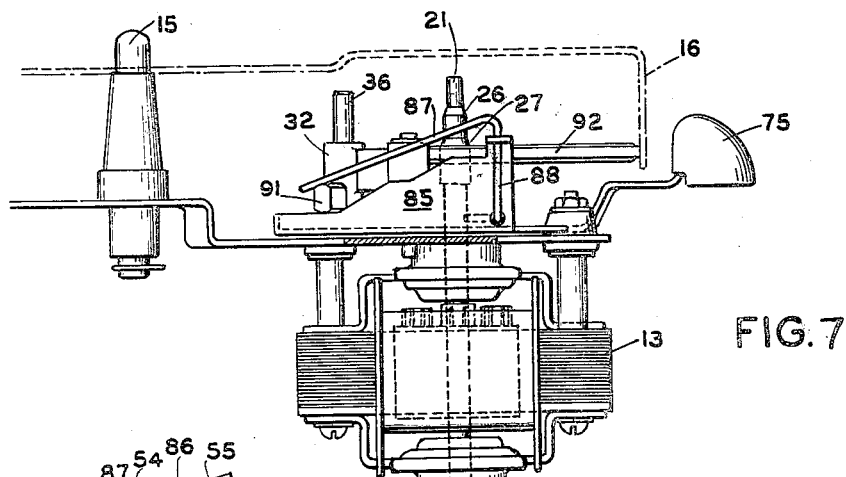
Figure 8:
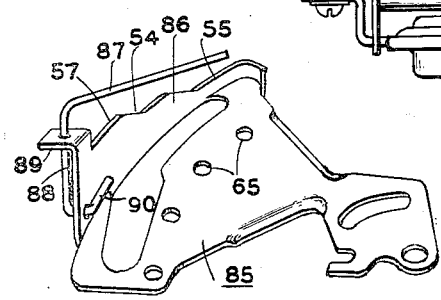
Figure 8 is a three dimensional view of the shifter cam in the modified form.

Figures 6, 7, and 8 show a modified form of the invention which is generally similar to that shown in Figures 1–5. A shifter plate 85 has an upstanding shifting cam 86, and a cam spring 87 is formed of a generally straight wire disposed generally parallel to the upper edge 54 of the shifter cam 86. The cam spring 87 has a vertical portion 88 extending through a shoulder 89 on the cam 86 and an in-turned end 90 extending through the cam 86 to hold the spring 87 in place.

The idler bearing 32 has an integral extending cam follower lug 91 extending transversely to the upstanding post 36 to cooperate with the upper edge 54. The cam spring 87 engages the upper surface of this cam follower lug 91. The idler wheel 31 has a tire 92 which in this case is not rounded since it has been found that the tire will move on the first and second conical surfaces 26 and 27 without necessity of the tire itself being rounded on its lower edge.

The operation of this modification of Figures 6, 7, and 8 is essentially the same as that for the embodiment of Figures 1–5. The movement of the shifter cam 85 causes the upper edge 54 with its inclined planes to coact with the cam follower lug 91 to give a raising movement to the idler bearing 32 when the shifter cam 85 is being moved to the left as viewed in Figure 7. During this movement the cam spring 87 gives both a vertically downward component and a component of force which is horizontally toward the right, as viewed in Figure 7, to maintain the tire 92 in engagement with the drive shaft 21. When the shifter cam 85 is being moved to the right, the cam spring 87 again gives a force urging the cam follower lug 91 downwardly and also a lateral component urging the idler wheel 31 against the drive shaft 21. Thus the force exerted by the cam spring 87 on the cam follower lug 91 is close to being perpendicular to the inclined planes on the upper edge 54.

Although this invention has been described in its preferred form with a certain degree of particularly, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. A change speed drive mechanism having a support with a shifter cam movable relative thereto and a drive shaft journalled relative thereto with first and second drive portions of different diameters on said drive shaft, said drive mechanism including, an output wheel, pivot means journalling said output wheel on an axis generally parallel to said drive shaft, means permitting relative movement of said output wheel and drive shaft in two generally perpendicular directions in a reference plane generally perpendicular to said drive shaft, said shifter cam having two steps at different levels relative to said reference plane corresponding to said two drive portions and interconnected by a sloping surface, a cam follower connected to relatively move said output wheel and said drive shaft in an axial direction, and spring means acting on said cam follower and relatively urging said cam follower and said shifter cam in an axial direction toward each other and also having a lateral component to relatively urge said output wheel and said drive shaft toward each other.

2. A change speed drive mechanism having a support with a shifter cam movable relative thereto and a drive shaft journalled relative thereto with first and second drive portions of different diameters on said drive shaft, said drive mechanism including, an output wheel, pivot means journalling said output wheel on an axis generally parallel to said drive shaft, means permitting relative movement of said output wheel and said drive shaft in two generally perpedicular directions in a reference plane generally perpendicular to said drive shaft, said shifter cam having two steps at different levels relative to said reference plane corresponding to said two drive portions and interconnected by a sloping surface, a cam follower connected to move said output wheel in an axial direction, and spring means acting on said cam follower and urging said output wheel in an axial direction toward said shifter cam and also having a lateral component to relatively urge said output wheel and said drive shaft toward each other, whereby, as the shifter cam is moved to cause said sloping surface to coact with said cam follower, the said lateral component of force of said spring means tends to counteract the component of force in a direction perpendicular to said drive shaft between said cam and cam follower which tends to cause said output wheel to retract from said drive shaft.

3. A change speed drive mechanism having a support with a shifter cam movable relative thereto and a drive shaft journalled relative thereto with first and second drive portions of different diameters on said drive shaft, said drive mechanism including, an idler wheel, pivot means journalling said idler wheel on an axis generally parallel to said drive shaft, means permitting movement of said idler wheel in two generally perpendicular directions in a reference plane generally perpendicular to said drive shaft, said shifter cam having two steps at different levels relative to said reference plane corresponding to said two drive portions and interconnected by a sloping surface, a cam follower connected to move said idler wheel in an axial direction, and spring means acting on said cam follower and urging said idler wheel in an axial direction toward said shifter cam and also having a lateral component to urge said idler wheel toward said drive shaft, whereby, as the shifter cam is moved to cause said sloping surface to coact with said cam follower, the said lateral component of force of said spring means tends to counteract the component of force in a direction perpendicular to said drive shaft between said cam and cam follower which tends to cause said idler wheel to retract from said drive shaft.

4. A change speed drive mechanism having a support with a shifter cam movably carried relative thereto and a drive shaft journalled relative thereto with first and second drive portions of different diameters on said drive shaft, said drive mechanism including, an idler wheel, pivot means journalling said idler wheel on an axis generally parallel to said drive shaft, means permitting movement of said idler wheel in two generally perpendicular directions in a reference plane generally perpendicular to said drive shaft, said shifter cam having two generally parallel steps at different levels relative to said reference plane corresponding to said two drive portions and interconnected by an inclined plane, a cam follower connected to move said idler wheel in an axial direction, and spring means acting on said idler wheel and urging said idler wheel in an axial direction toward said shifter cam and also having a lateral component to urge said idler wheel toward said drive shaft, whereby, as the shifter cam is moved to cause said inclined plane to coact with said cam follower, the said lateral component of force of said spring means tend to counteract the component of force in a direction perpendicular to said drive shaft between said cam and cam follower which tends to cause said idler wheel to retract from said drive shaft.

5. A change speed drive mechanism having a support with a shifter cam movable relative thereto and a drive shaft journalled relative thereto with first and second drive portions of different diameters on said drive shaft, said drive mechanism including, an idler mechanism, first means to movably support said idler mechanism relative to said support, an idler wheel, pivot means journalling said idler wheel on said idler mechanism, means including said first means permitting movement of said idler wheel in two generally perpendicular directions in a reference plane generally perpendicular to the axis of said pivot means, means urging said idler wheel toward engagement with said drive shaft, said shifter cam having two generally parallel steps at different levels relative to said reference plane and corresponding to said two drive portions and interconnected by an inclined plane, a cam follower on said idler mechanism connected to move said idler wheel in an axial direction, cam spring means carried on said cam and connected to urge said idler wheel in an axial direction toward said shifter cam and also having a lateral component to urge said idler wheel toward said drive shaft, whereby, as the shifter cam is moved to cause said inclined plane to coact with said cam follower, the said lateral component of force of said cam spring means tends to counteract the component of force in a direction perpendicular to said axis between said cam and cam follower which tends to cause said idler wheel to retract from said drive shaft, whereby said idler wheel slides axially along said drive shaft from one drive portion to the other.

6. An idler mechanism for a phonograph turntable drive having a support plate with a shifter cam movably carried thereon and a drive shaft journalled relative thereto with first and second drive portions of different diameters on said drive shaft, said idler mechanism including, first pivot means to pivotally support said idler mechanism relative to said support plate, an idler wheel, second pivot means journalling said idler wheel on said idler mechanism, means including said first pivot means permitting movement of said idler wheel in two generally perpendicular directions in a reference plane generally perpendicular to the axes of said pivot means, means urging said idler wheel toward engagement with said drive shaft, said shifter cam having two generally parallel steps at different levels corresponding to said two drive portions and interconnected by an inclined plane, a cam follower on said idler mechanism on only one side of said first pivot means and connected to move said idler wheel in an axial direction, cam spring means connected to urge said idler wheel in an axial direction toward said shifter cam and also having a lateral component to urge said idler wheel toward said drive shaft, whereby, as the shifter cam is moved to cause said inclined plane to coact with said cam follower, the said lateral component of force of said cam spring means tends to counteract the component of force in a direction perpendicular to said axes between said cam and cam follower which tends to cause said idler wheel to retract from said drive shaft, whereby said idler wheel slides axially along said drive shaft from one drive portion to the other.

7. An idler mechanism for a phonograph turntable drive having a support plate with a shifter cam pivoted thereto and a drive shaft journalled relative thereto with first and second drive portions of different diameters on said drive shaft, said idler mechanism including, first pivot means to pivotally support said idler mechanism relative to said support plate, an idler wheel, second pivot means journalling said idler wheel on said idler mechanism, means including said first pivot means permitting movement of said idler wheel in two generally perpendicular directions in a reference plane generally perpendicular to the axes of said pivot means, an idler spring urging said idler wheel toward engagement with said drive shaft, said shifter cam having two generally parallel steps at different levels corresponding to said two drive portions and interconnected by an inclined plane, a cam follower on said idler mechanism on only one side of said first pivot means and connected to move said idler wheel in an axial direction, a cam spring connected to urge said idler mechanism in an axial direction toward said shifter cam and also having a lateral component to urge said idler wheel toward said drive shaft, whereby, as the shifter cam is moved to cause said inclined plane to coact with said cam follower, the said lateral component of force of said cam spring at least counteracts the component of force in a direction perpendicular to said axes between said cam and cam follower which tends to cause said idler wheel to retract from said drive shaft, whereby said idler wheel slides axially along said drive shaft from one drive portion to the other.

8. In a phonograph turntable drive mechanism, the provision of a support plate for supporting a turntable, a drive shaft journalled relative to said plate and having first and second drive portions of different diameters interconnected by a sloping surface, an idler wheel, first pivot means journalling said idler wheel on an axis generally parallel to said drive shaft, means permitting movement of said idler wheel in two generally perpendicular directions in a reference plane generally perpendicular to said drive shaft, an idler spring urging said idler wheel toward engagement with said drive shaft and a portion of said turntable for frictional drive of said turntable, said two directions of movement of said idler wheel permitting free floating movement within limits to accommodate any eccentricities in said drive mechanism and to accommodate the two different diameters of said drive portions, a shifter cam pivoted by second pivot means on an axis generally parallel to said drive shaft, two generally parallel steps on said cam at different levels corresponding to said two drive portions and interconnected by an inclined plane, a cam follower coacting with said cam and connected to move said idler wheel in an axial direction, a cam spring connected to urge said idler wheel in an axial direction toward said shifter cam and also having a lateral component such as to urge said idler wheel toward said drive shaft, whereby, as the shifter cam is moved to cause said inclined plane to coact with said cam follower, the said lateral component of force of said cam spring at least counteracts the component of force in a direction perpendicular to said axes between said shifter cam and said cam follower which tends to cause said idler wheel to retract from said drive shaft, whereby said idler wheel slides axially along said drive shaft from one drive portion to another by sliding on said sloping surface.

9. In a phonograph turntable drive mechanism, the provision of a support plate for supporting a turntable, a drive shaft journalled relative to said plate and having first and second drive portions of different diameters interconnected by a sloping surface, an idler mechanism, first pivot means to pivotally support said idler mechanism relative to said support plate, an idler wheel, second pivot means journalling said idler wheel on said idler mechanism, means including said first pivot means permitting movement of said idler wheel in two generally perpendicular directions in a reference plane generally parallel to said support plate, an idler spring urging said idler wheel toward engagement with said drive shaft and a portion of said turntable for frictional drive of said turntable, said two directions of movement of said idler wheel permitting free floating movement within limits to accommodate any eccentricities in said drive mechanism and to accommodate the two different diameters of said drive portions, a shifter cam pivoted by third pivot means on said support plate, detent means cooperating with said shifter cam to selectively hold same in selected positions relative to said support plate, two generally parallel steps on said cam at different levels relative to said plate and interconnected by an inclined plane, a cam follower on said idler mechanism on only one side of said first pivot means and in a line intersecting said first and third pivot means and connected to move said idler wheel in an axial direction, a cam spring connected between said support plate and said idler mechanism and urging said idler mechanism in a perpendicular direction toward said shifter cam and also having a rotational component on said idler mechanism such as to urge said idler wheel toward said drive shaft, whereby, as the shifter cam is moved to cause said inclined plane to coact with said cam follower, the said rotational component of force of said cam spring at least counteracts the component of force in a parallel direction between said shifter cam and said idler mechanism which tends to cause said idler wheel to retract from said drive shaft, whereby said idler wheel slides axially along said drive shaft from one drive portion to another by sliding on said sloping surface.

10. In a phonograph turntable drive mechanism, the provision of a support plate for supporting a turntable, a drive shaft journalled relative to said plate and having first and second drive portions of different diameters interconnected by a sloping surface, an idler mechanism including an idler wheel and journalled on a first pivot relative to said plate, a second pivot journalling said idler wheel on said idler mechanism, said two pivots and said drive shaft being substantially parallel, means including said first and second pivots to permit axial movements and movements in two dimensions perpendicular to said axes of said idler wheel, an idler spring urging said idler wheel into frictional engagement with said drive shaft and said turntable, said second pivot being off the center line between said first pivot and said drive shaft, a shifter cam pivoted on said support plate and having two steps interconnected by an inclined plane, a cam follower on said idler mechanism and being only on one side of said first pivot at a radius less than one-tenth the distance between said first and second pivots, said cam follower being connected to move said idler wheel in an axial direction, a cam spring connected from said support plate to said idler mechanism and urging said cam follower against said shifter cam and disposed to exert additionally a rotational force urging said idler wheel toward said drive shaft, whereby, as the shifter cam is moved to cause said inclined plane to coact against said cam follower, the said rotational force of said cam spring at least counteracts the component of force in the direction perpendicular to said axes between said upstanding cam and said cam follower which tends to cause said idler wheel to retract from said drive shaft and said turntable, whereby said idler wheel slides axially along said drive shaft from one drive portion to the other by sliding on said sloping surface.

11. In a phonograph turntable drive mechanism, the provision of a support plate, a drive shaft journalled relative to said plate and having first and second generally cylindrical drive portions of different diameters joined by a sloping surface, an idler mechanism including an idler bearing, an idler link, and an idler wheel, first pivot means journalling said idler bearing for rotation and axial translation generally perpendicular to said support plate, second pivot means pivotally interconnecting said idler bearing and said idler link, third pivot means pivotally carrying said idler wheel on said idler link for rotation on an axis generally perpendicular to said support plate in a position to engage a portion of a turntable and either of said cylindrical shaft portions, said idler bearing and said idler link pivoted at said second pivot means defining a toggle linkage with movement in a first direction of said second pivot means collapsing said toggle linkage to withdraw said idler wheel from said drive shaft, a shifter cam pivoted on said support plate at fourth pivot means, detent means cooperating with said shifter cam to selectively hold said shifter cam in selected positions relative to said support plate, said cam having two generally parallel steps at different levels relative to said plate and interconnected by an inclined plane, a cam follower surface on the under side of said idler bearing and being only on one side of said idler bearing and on a line intersecting said first and fourth pivot means, an idler spring urging said idler wheel into frictional engagement with said drive shaft and said turntable, a cam spring connected from said support plate to a portion of said idler bearing other than axially aligned with said first pivot means and urging said idler bearing cam follower against said shifter cam and disposed to exert a force other than perpendicular to said support plate in a direction to be more nearly perpendicular to said inclined plane and to contain both a perpendicular and a parallel force component, whereby as the shifter cam is moved to cause said inclined plane to coact against said cam follower, the parallel component of force of said cam spring at least counteracts the component of force in a parallel direction between said shifter cam and cam follower which tends to cause said idler linkage to collapse and said idler wheel to retract from said shaft, whereby said idler wheel slides axially along said shaft from one drive portion to the other by sliding on said sloping surface.

12. In a phonograph turntable drive mechanism, the provision of a support plate, a drive shaft journalled relative to said plate and having first and second generally cylindrical drive portions of different diameters joined by a generally conical surface, a perpendicular post carried by said supporting plate, an idler mechanism including an idler bearing, an idler link, and an idler wheel, said idler bearing being journalled for rotation and axial translation on said post, a perpendicular axle pivotally interconnecting said idler bearing and said idler link, a friction tire on said idler wheel having a rounded edge, means pivotally carrying said idler wheel on said idler link for rotation on an axis generally perpendicular to said support plate in a position to have said tire engage a portion of a turntable and either of said cylindrical shaft portions, said idler bearing and said idler link pivoted at said vertical axle defining a toggle linkage with movement in a first direction of said vertical axle collapsing said toggle linkage to withdraw said idler wheel from said drive shaft, a shifter plate pivoted on said support plate and disposed generally parallel thereto, spring detent means cooperating with said shifter plate to selectively hold said shifter plate in selected positions relative to said support plate, a shifter cam on said shifter plate having an upper edge including two plateaus interconnected by a sloping inclined plane, said inclined plane sloping away from said support plate, a cam follower surface on the under side of said idler bearing and being only on one side of said idler bearing, an idler spring urging said idler wheel into frictional engagement with said drive shaft and said turntable, a cam spring connected from said support plate to a portion of said idler bearing other than axially aligned therewith and urging said idler bearing cam follower against said shifter cam and disposed to exert a force other than perpendicular to said support plate in a direction to be more nearly perpendicular to said inclined plane and to contain both a perpendicular and a parallel force component, whereby, as the shifter cam is moved to cause said inclined plane to coact against said cam follower, the parallel component of force of said cam spring at least counteracts the component of force in a parallel direction between said shifter cam and said idler bearing which tends to cause said idler linkage to collapse, whereby said idler wheel slides axially along said drive shaft from one drive portion to the other by the rounded edge of said tire sliding on said conical surface.

13. In a phonograph drive mechanism wherein a motor drives a turntable, the provision of a support plate, a drive shaft journalled relative to said plate and having first, second, and third coaxial cylindrical drive portions of successively increasing diameters in the direction extending away from the end of the shaft, first and second generally conical surfaces interconnecting said first and second and said second and third cylindrical drive portions, respectively, an upstanding post carried by said supporting plate, an idler mechanism including an idler bearing, an idler link, and an idler wheel, said idler bearing being journalled for rotation and vertical translation on said upstanding post, a vertical axle pivotally interconnecting said idler bearing and said idler link, a tire on said idler wheel having a rounded lower edge, means pivotally carrying said idler wheel on said idler link for rotation on a generally vertical axis in a position to have said tire drivingly engage said turntable and any of said cylindrical shaft portions, said idler bearing and said idler link pivoted at said vertical axle defining a toggle linkage disposed in a first direction relative to the center line between said upstanding post and said pivot of said idler wheel, a shifter plate pivoted on said support plate and disposed generally parallel thereto, spring detent means cooperating with said shifter plate to selectively hold said shifter plate in selected positions relative to said support plate, a shifter cam on said shifter plate and having an upper edge including three plateaus interconnected by two sloping inclined planes, said inclined planes sloping upwardly away from said support plate in a direction generally parallel to said first direction, a cam follower on the under side of said idler bearing and being only on that side of said idler bearing diametrically opposite the pivot point of said shifter plate relative to said upstanding post, an idler spring urging said idler wheel into frictional engagement with said drive shaft and said turntable, a cam spring connected from the outboard side of said idler bearing to said support plate and urging said idler bearing cam follower downwardly against said shifter cam and disposed to exert a force off the vertical in a direction to be more nearly perpendicular to said inclined planes and to contain both a horizontal and a vertical force component, whereby, as the shifter cam is moved to cause either of said inclined planes to coact against said cam follower, the horizontal component of force of said cam spring at least counteracts the component of force in a horizontal direction between said upstanding cam and said idler bearing which tends to cause said idler wheel to retract from said drive shaft and said turntable, whereby said idler wheel slides vertically along said drive shaft from one drive portion to the other by sliding on one of said conical surfaces.

14. In a phonograph drive mechanism wherein a motor drives a turntable, the provision of a support plate, means for supporting the motor from said plate, a shaft extending from said motor through an aperture in said plate and having first, second, and third coaxial cylindrical drive portions of successively increasing diameters in the direction from the end of the shaft toward said supporting plate, first and second generally conical surfaces interconnecting said first and second and said second and third cylindrical drive portions, respectively, a perpendicular post carried by said supporting plate, an idler mechanism including an idler bearing, an idler link, and an idler wheel, said idler bearing being journalled for rotation and axial translation on said post, a perpendicular axle pivotally interconnecting said idler bearing and said idler link, a friction tire on said idler wheel having rounded upper and lower edges, means pivotally carrying said idler wheel on said idler link for rotation on an axis generally perpendicular to said support plate in a position to have said tire engage a portion of said turntable and any of said cylindrical shaft portions, said idler bearing and said idler link pivoted at said vertical axle defining a toggle linkage disposed in a first direction relative to the center line between said post and said pivot of said idler wheel, a shifter plate pivoted on said support plate and disposed generally parallel thereto, a hold-down and detent bracket generally parallel to and superposed on said shifter plate and stationarily connected between said shifter plate pivot point and said upstanding post, spring detent means carried on said detent bracket and cooperating with said shifter plate to selectively hold said shifter plate in selected positions relative to said support plate, a slotted aperture in the outboard end of said shifter plate designed to surround both said upstanding post and said vertical axle, an upstanding cam defining the outboard edge of said slotted aperture, said upstanding cam having an upper edge including three plateaus interconnected by two sloping inclined planes, said inclined planes sloping away from said support plate in a direction generally parallel to said first direction, a cam follower surface on the under side of said idler bearing and being only on that side of said idler bearing diametrically opposite the pivot point of said shifter plate relative to said upstanding post, an idler spring urging said idler wheel into frictional engagement with said motor shaft and said turntable portion, a cam spring connected from the outboard side of said idler bearing to said support plate and urging said idler bearing cam follower against said upstanding cam and disposed to exert a force other than perpendicular to said support plate in a direction to be more nearly perpendicular to said inclined planes and to contain both a perpendicular and a parallel force component, whereby, as the upstanding cam is moved to cause either of said inclined planes to coact against said cam follower, the parallel component of force of said cam spring at least counteracts the component of force in a parallel direction between said upstanding cam and said idler bearing which tends to cause said idler wheel to retract from said motor shaft, whereby said idler wheel slides axially along said motor shaft from one drive portion to the other by sliding on one of said conical surfaces.

15. In a phonograph drive mechanism wherein a motor drives a depending flange of a turntable, the provision of a support plate, means for dependently supporting the motor from said plate, a vertical shaft extending upwardly from said motor through an aperture in said plate and having first, second, and third coaxial cylindrical drive portions of successively increasing diameters in the direction from the end of the shaft toward said supporting plate, first and second conical surfaces interconnecting said first and second and said second and third cylindrical drive portions, respectively, an upstanding post carried by said supporting plate, an idler mechanism including an idler bearing, an idler link, and an idler wheel, said idler bearing being journalled for rotation and vertical translation on said upstanding post, a vertical axle pivotally interconnecting said idler bearing and said idler link, a rubber-like tire on said idler wheel having rounded upper and lower edges, means pivotally carrying said idler wheel on said idler link for rotation on a generally vertical axis in a position to have said tire engage said depending turntable flange and any of said cylindrical shaft portions, said idler bearing and said idler link pivoted at said vertical axle defining a toggle linkage disposed in a first direction relative to the center line between said upstanding post and said pivot of said idler wheel, a shifter plate pivoted on said support plate and disposed generally parallel thereto, a hold-down and detent bracket generally parallel to and superposed on said shifter plate and stationarily connected between said shifter plate pivot point and said upstanding post, spring detent means carried on said detent bracket and cooperating with said shifter plate to selectively hold said shifter plate in any of four selected positions relative to said support plate, a slotted aperture in the outboard end of said shifter plate designed to surround both said upstanding post and said vertical axle, three of said four selected positions corresponding to selected drive conditions of said idler wheel in engagement with any of said three shaft drive portions, a retract cam defining part of the inboard edge of said slotted aperture to cooperate with said vertical axle for a disengaged position of said idler wheel and said shaft when said shifter plate is in the fourth of said selected positions, an upstanding vertical cam defining the outboard edge of said slotted aperture, said upstanding cam having an upper edge including three plateaus interconnected by two sloping inclined planes, said inclined planes sloping upwardly away from said support plate in a direction generally parallel to said first direction, a planar surface perpendicular to said upstanding post on the under side of said idler bearing, said upper edge of said upstanding cam cooperating with a portion of said planar surface as a cam follower, said portion being only on that side of said idler bearing diametrically opposite the pivot point of said shifter plate relative to said upstanding post, an idler spring urging said idler wheel into frictional engagement with said motor shaft and said depending flange, a cam spring connected from the outboard side of said idler bearing to said support plate and urging said idler bearing downwardly against said upstanding cam and disposed to exert a force off the vertical in a direction to be more nearly perpendicular to said inclined planes and to contain both a horizontal and a vertical force component, whereby, as the upstanding cam is moved to cause either of said inclined planes to coact against said portion of said planar surface as a cam follower, the horizontal component of force of said cam spring at least counteracts the component of force in a horizontal direction between said upstanding cam and said idler bearing which tends to cause said idler wheel to retract from said motor shaft and said turntable flange, whereby said idler wheel slides vertically along said motor shaft from one drive portion to the other by sliding on one of said conical surfaces.

16. A change speed drive mechanism having a support with a shifter cam movable relative thereto and a drive shaft journalled relative thereto with first and second drive portions of different diameters on said drive shaft, said drive mechanism including, an idler wheel, pivot means journalling said idler wheel, means permitting movement of said idler wheel in two generally perpendicular directions in a reference plane generally perpendicular to the axis of said pivot means, means urging said idler wheel toward engagement with said drive shaft, said shifter cam having two generally parallel steps at different levels relative to said reference plane and corresponding to said two drive portions and interconnected by an inclined plane, a cam follower connected to move said idler wheel in an axial direction, cam spring means connected to urge said idler wheel in an axial direction toward said shifter cam and also having a lateral component to urge said idler wheel toward said drive shaft, whereby, as the shifter cam is moved to cause said inclined plane to coact with said cam follower, the said lateral component of force of said cam spring means tends to counteract the component of force in a direction perpendicular to said axis between said cam and cam follower which tends to cause said idler wheel to retract from said drive shaft, whereby said idler wheel slides axially along said drive shaft from one drive portion to the other.

References Cited in the file of this patent

UNITED STATES PATENTS

| | | |
|---|---|---|
| 2,606,451 | Cole | Aug. 12, 1952 |
| 2,612,053 | Capell | Sept. 30, 1952 |
| 2,621,527 | Guest et al. | Dec. 16, 1952 |
| 2,756,603 | Tsien | July 31, 1956 |
| 2,826,926 | Singer | Mar. 18, 1958 |